United States Patent [19]
Timmermans et al.

[11] 4,103,233
[45] Jul. 25, 1978

[54] INSTALLATION FOR THE MEASURING OF AN ESSENTIALLY LINEAR DISPLACEMENT

[75] Inventors: Armand Timmermans; Eduard Selleslagh, both of Haasdonk; José N. E. Deneyer, Petit-Enghien, all of Belgium

[73] Assignee: Verenigde Energiebedrijven van het Scheldeland, Antwerp, Belgium

[21] Appl. No.: 713,835

[22] Filed: Aug. 12, 1976

[30] Foreign Application Priority Data

Aug. 13, 1975 [BE] Belgium .................................. 159166
Jul. 10, 1976 [BE] Belgium .................................. 169417

[51] Int. Cl.² .......................................... G01R 33/12
[52] U.S. Cl. .................................... 324/208; 340/195; 176/19 EC
[58] Field of Search ............... 324/34 R, 34 D, 34 PS, 324/40; 340/195, 196; 73/313, 314, DIG. 5; 176/19 R

[56] References Cited

U.S. PATENT DOCUMENTS

| 2,928,043 | 3/1960 | Foerster | 324/40 |
| 3,209,341 | 9/1965 | Lide | 340/196 |
| 3,358,225 | 12/1967 | Peugeot | 324/40 |

*Primary Examiner*—Robert J. Corcoran
*Attorney, Agent, or Firm*—Bacon & Thomas

[57] ABSTRACT

Installation for the measuring of an essentially linear displacement of a body, with a fixed coil and axial direction of which corresponds to the direction of the displacement to be measured, a rod the magnetic permeability of which differs from the magnetic permeability of the medium which is surrounded by the coil, means for connecting said rod along the axis of the coil to that body the displacement of which should be measured, an A.C. source with constant amplitude and pulsation (angular frequency) causing a voltage drop in the coil, means electrically connected to the coil and generating a voltage signal dependent of and in phase with the voltage drop in the coil, means electrically connected in series with the AC current source, generating a signal proportional to and in phase with the current through the coil, means for phase shifting by 90° with respect to the current one of said signals, which means are electrically connected to the means which generates the shifted signal, a device which operates as a multiplier for multiplying the phase-shifted signal and the other signal which device is electrically connected to the means for phase shifting and to the means for generating the non-shifted signal and a meter electrically connected to the device which operates as a multiplier measuring the signal obtained by the multiplication performed in the device.

22 Claims, 12 Drawing Figures

INSTALLATION FOR THE MEASURING OF AN ESSENTIALLY LINEAR DISPLACEMENT

This invention relates to an installation for the measuring of an essentially linear displacement, with a fixed coil the axial direction of which corresponds to the direction of the displacement to be measured, a rod the magnetic permeability of which differes from the magnetic permeability of the medium which is surrounded by the coil, means to connect said rod along the axis of the coil to that body the displacement of which should be measured, an A.C. source with constant amplitude and pulsation or angular frequency said coil, and a meter.

Installations of this kind are notably used for the measuring of the linear displacement of a control rod inside a pressurized-water nuclear reactor. The control rod then comprises the body the displacement of which should be measured and said rod the magnetic permeability of which differs from the magnetic permeability of the medium which the coil surrounds is then connected to the control rod in such a way that both rods move in the same way. The rod which is connected to the control rod and lies in the extension thereof can move up and down inside a casing which forms a projection of the reactor tank. The casing material and the water filling said casing have about the same magnetic permeability. They form the medium which is surrounded by the coil. The coil lies about the casing.

The coil has an impedance $Z = R + j\zeta\omega$.

As the magnetic permeability of the rod that moves up and down inside the casing and thus further down into or further out from the coil, differs from the magnetic permeability of the water and from the one of the casing material, thus from the magnetic permeability of the medium which is surrounded by the coil, the coil inductance $\zeta$ is a function of the rod position inside the coil. The inductance $\zeta$ and consequently also the impedance $Z$ are thus a measure of the rod position inside the coil and thus of the position of that body the linear displacement of which should be measured, in the above example the reactor control rod.

In the known installations of this kind, the meter is directly connected to the coil terminals, in such a way that the meter measures the product of the constant current intensity by the changing impedance.

The change in the impedance originates in the resistance change and the reactance change according to the formula $\Delta Z = \Delta R + J\Delta\zeta\omega$. Actually it is only desired to know $\Delta\zeta$ but in practice $\Delta R$ is much larger than $\Delta\zeta\omega$ notably because of the dependence on the temperature of the ohmic resistance. The direct measuring with the meter of the voltage across the coil thus has the heavy drawback that a measure is made of the product of the constant current by the changing impedance in which the resistance plays a great part. The signal from the meter in the known installation is directly proportional to $|Z| = \sqrt{R^2 + (\zeta\omega)^2}$. Not only is the absolute value of Z larger than the absolute value of $\zeta\omega$ it is desired to know but also the value which is being measured varies not only as a function of the variable it is desired to know, namely the inducatance $\zeta$, but also as a function of the resistance changes. The alternating current resistance caused by the eddy current losses in the rod also plays a large part thereby.

The invention has for object to obviate the disturbing factors and one object of the invention is to obtain in the meter a signal that varies exclusively and as linearly as possible with the inductance $\zeta$.

For this purpose, the installation according to the invention comprises means electrically connected to the coil and generating a voltage signal dependent of and in phase with the voltage drop across the coil, means electrically connected in series with the AC current source, generating a signal proportional to and in phase with the current through the coil, means for phase shifting by 90° with respect to the current one of said signals, which means are electrically connected to the means which generates this signal, a device which operates as a multiplier for multiplying the phase-shifted signal and the other signal which device is electrically connected to the means for phase shifting and to the means for generating the non-shifted signal and a meter electrically connected to the device which operates as a multiplier measuring the signal obtained by the multiplication performed in the device.

In an advantageous embodiment of the invention, the device which operates as a multiplier is an analog multiplier, the means generating a signal proportional to and in phase with the current being means generating a voltage signal, the installation further comprising a filter which is mounted between the multiplier and the meter and which passes only the continuous portion of the signal obtained by multiplication.

In an embodiment of the invention, the means generating a voltage signal dependent of and in phase with the voltage drop are shunting the coil and generate a voltage proportional to and in phase with the voltage drop itself.

In an advantageous embodiment of the invention, the means generating a voltage signal dependent of and in phase with the voltage drop across the coil are comprised of means connected to the coil generating a voltage proportional to the voltage drop across the coil itself, means generating voltage which is proportional to and in phase with the current through the coil, which means are connected in series with the coil and the AC current source, and means electrically connected to the last mentioned means for subtracting the last mentioned voltage which is proportional to and in phase with the current from the first mentioned voltage proportional to the voltage drop across the coil.

In a very useful embodiment of the invention, the means generating a voltage signal dependent of and in phase with the voltage drop across the coil comprises means connected to the coil generating a voltage proportional to the voltage drop across the coil, means generating a voltage which is proportional to the current and lags in phase by 90° with respect to the current and means adding the two last mentioned voltages.

In a particular embodiment of the invention, particularly suitable to be designed electronically, the device which operates as a multiplier is a digitally working multiplier.

Preferably the alternating current source generates a sinusoidal voltage, the means for phase shifting by 90° with respect to the current are connected to the means for generating a signal proportional to and in phase with the current, the two last mentioned means being comprised by means that generates for a period of the current, from a zero value of this current, a signal which is proportional to the current derivative which is the digital form of the signal proportional to the current but 90° phase-shifted, the device which operates as a multiplier multiplying the instantaneous voltage drop across the coil and said signal proportional to the current derivative, and integrating the multiplication produce over said period connected between the multiplier and the meter.

In a very particluar embodiment of the invention, the alternating current source which generates a sinusoidal current comprises means for feeding increments to a digital-analog converter such that the output signal of this converter corresponds with the sinusoidal current, and the means for generating a signal proportional to the derivative of the current are comprised of those means forming increments.

The installation may also be so designed as to measure the linear displacement of different bodies and some components may then be provided but singly and used by the measuring of the linear displacement of each one of said bodies.

In this embodiment the installation according to the invention comprises for each body the displacement of which should be measured, a fixed coil the axial direction of which corresponds with the direction of the displacement to be measured, a rod the magnetic permeability of which differs from the magnetic permeability of the medium which is surrounded by the coil, means to connect this rod along the coil axis to said body, and a meter, as well as one or more alternating current sources with constant amplitude and angular frequency, means feeding each of the coils successively from said alternating current sources, means electrically connected to the coil and generating a voltage signal dependent of and in phase with the voltage drop across the coil, means electrically connected in series with the AC current source, generating a signal proportional to and in phase with the current through the coil, means for phase shifting by 90° with respect to the current one of said signals, which means are electrically connected to the means which generates this signal, a device which operates as a multiplier for multiplying the phase-shifted signal and the other signal which device is electrically connected to the means for phase shifting and to the means for generating the non-shifted signal and a meter electrically connected to the device which operates as a multiplier measuring the signal obtained by the multiplication performed in the device.

Other details and features of the invention will stand out from the description given below by way of non-limitative example and with reference to the accompanying drawings, in which.

In the various figures, the same reference numerals pertain to similar elements.

Figure 1:
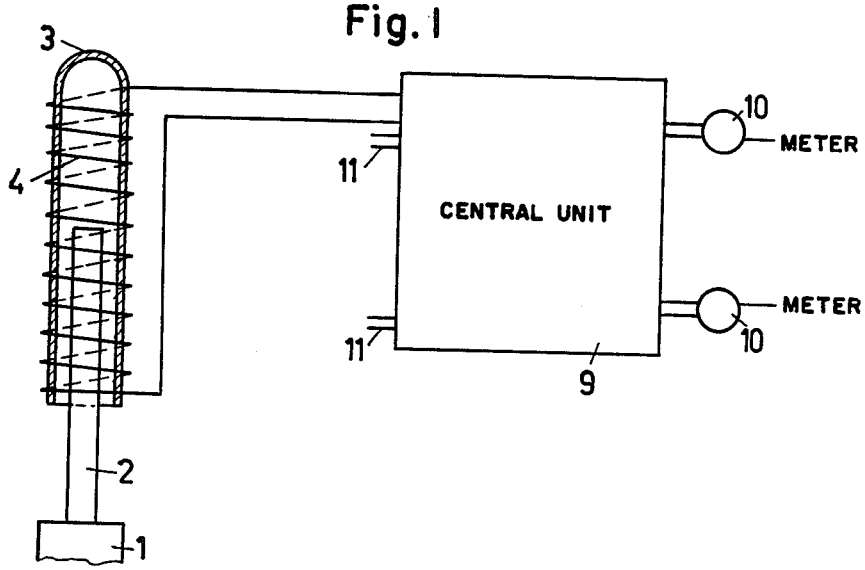
FIG. 1 is a principle diagram of an installation for the measuring of an essentially linear displacement according to the invention.

The installation according to the invention permits a determination of the position of a body. More particularly the installation according to the invention as shown essentially in FIG. 1 permits a determination of the position of various bodies 1, only one such body being shown diagrammatically in FIG. 1. Said bodies are for instance the control rods of a pressurized water nuclear reactor. To each control rod. or body 1 is fastened in the extension thereof, a rod 2. Said rod 2 moves up and down together with control rod 1 inside a casing 3 that forms a projection from the reactor tank. The casing material and the water filling said casing have approximately the same magnetic permeability.

Figure 12:
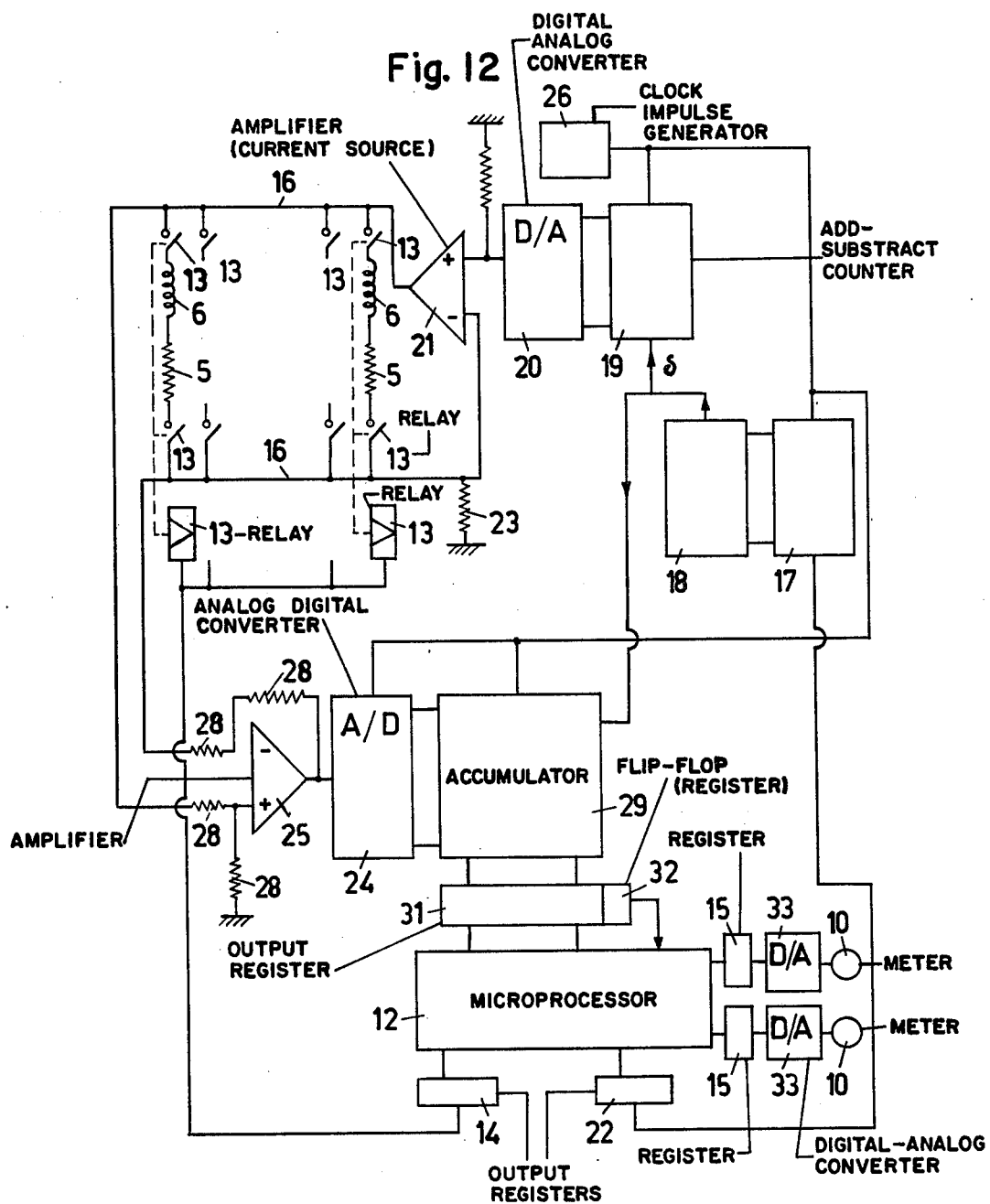
FIG. 12 is a simplified diagram of an installation according to the invention fulfilling the teachings of FIG. 1.

The casing 3 is surrounded by a coil 4 which has been shown in FIG. 12 by means of the equivalent resistance R 5 and inductance $\zeta$ 6.

The inductance $\zeta$ and the resistance R of coil 4 vary according to the position of rod 2 inside casing 3 and thus inside coil 4. The magnetic permeability of rod 2 which moves up and down inside casing 3 and thus enters more deeply coil 4 or moves out thereof, always differs from the magnetic permeability of the water and the one of the casing material.

The inductance $\zeta$ is not only dependent on the position of rod 2 inside coil 4 but also on the current frequency.

Figure 2:
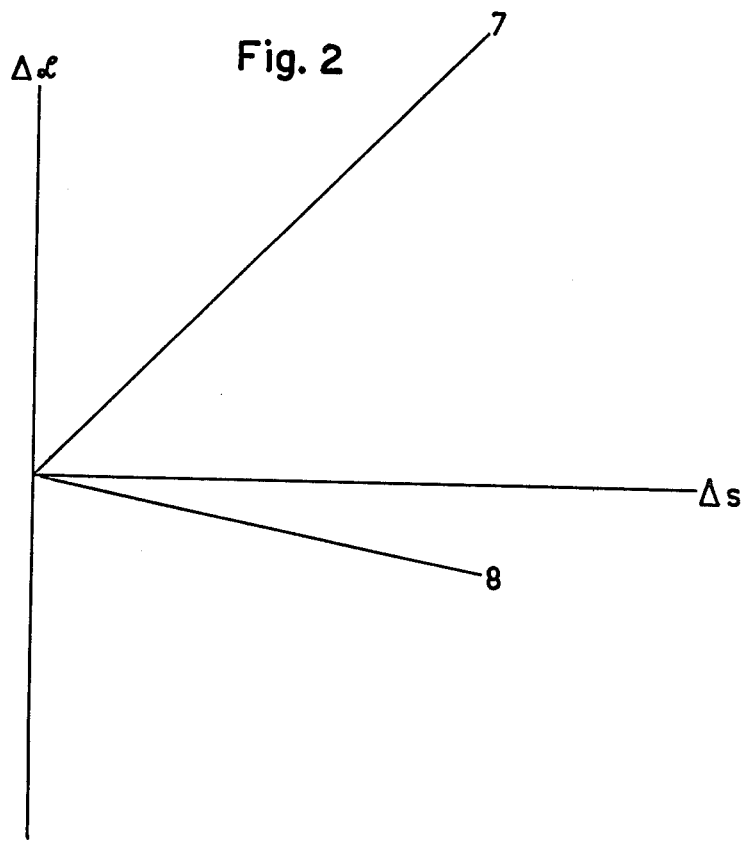
FIG. 2 is a diagram showing the course of the coil inductance as a function of the rod displacement inside the coil for two different frequencies of the alternating current source.

FIG. 2 gives for two different frequencies and under a constant temperature, the variation of the inductance ($\Delta\zeta$) as a function of the variation in the position of rod 2 inside coil 4.

The curve 7 pertains to a lower frequency and curve 8 pertains to a higher frequency.

The curves show the inductance increase or decrease from the inductance of coil 4 as rod 2 comes with the upper end thereof level with the lower end of coil 4. Such variation of inductance ($\Delta\zeta$) is shown as a function of the length ($\Delta s$) over which rod 2 has entered coil 4.

The resulting inductance change is comprised of two portions. A first portion ($\Delta\zeta_1$) results from the increase in the magnetic permeability of the medium which is surrounded by the coil, due to rod 2 entering coil 4. Said change runs in the same direction as $\Delta s$. Thus for $\Delta s > 0$, $\Delta\zeta_1 > 0$.

A second portion ($\Delta\zeta_2$) results from eddy currents in the rod. This portion is dependent on the frequency. The absolute value thereof increases with the frequency. Said portion varies in the opposite direction to $\Delta s$. Thus for $\Delta s > 0$, $\Delta\zeta_2 < 0$. For the lower frequencies (curve 7) the first portion prevails. Thus $|\Delta\zeta_1| > |\Delta\zeta_2|$. When $\Delta s > 0$, there results $\Delta\zeta_{1 + \Delta\zeta_2} > 0$. The inductance increases as the rod further enters the coil. For the higher frequencies (curve 8), however, the second portion prevails. Thus $|\Delta\zeta_2| > |\Delta\zeta_1|$. When $\Delta s > 0$, there results $\Delta\zeta_{1 + \Delta\zeta_2} < 0$. The inductance decreases as the rod further enters the coil.

For every coil it is possible to know the curve $\Delta\zeta = F(\Delta s)$, by calibrating for every desired frequency. In the same way, it is also possible to know the inductance ($\zeta$ o) when the rod 2 comes with the upper end thereof to the lower end of coil 4. From the value $\zeta = \zeta o + \Delta\zeta$ it is possible to know by means of the curve for the applied frequency, the position of rod 2 and thus of conrol rod 1.

The coil 4 is fed from a current source 21, connected in series with the coil, which feeds through the coil a current with very constant amplitude I and very constant pulsation or angular frequency $\omega$. The voltage drop across coil 4 is $\underline{I}$. $\underline{Z}$. When the impressed current is I cos $\omega$ t, the voltage drop across coil 4, is an alternating current having as amplitude $I \sqrt{R^2 + (\zeta\omega)^2}$. Said alternating voltage leads the current I by an angle arctan $\phi = (\zeta\omega/R)$.

As I and $\omega$ are accurately constant, the amplitude of said alternating voltage is dependent but on R and $\zeta$, which with a fixed value for I and $\omega$, are exclusively dependent on the temperature and the displacements that the rod has undergone inside the coil.

The resistance R is dependent among others on the temperature which may be measured with a thermocouple in such a way that the influence of temperature on R may be computed and originally, the value for $\zeta$ can be obtained from the measurement of the voltage drop across coil 4. However, the results thus obtained are completely unreliable, notably because the resistance R is not fixed unequivocally even for a given temperature. The value of R always varies with the displacement of the rod inside the coil.

Moreover the variations of resistance R are quite large relative to the variations of reactance $\zeta\omega$ and cannot be determined accurately, in such a way that it would be difficult to determine the values of $\zeta\omega$ and of $\Delta\zeta\omega$.

All of the installations according to the invention and as shown in FIGS. 1, 3 to 7 and 12 suppress in one or another way the influence of resistance R from the signal fed to the meter. They generate from the voltage across coil 4, a signal which is proportional to the voltage component which is shifted by 90° relative to the current, thus a signal which is proportional to $\zeta\omega$ and which is fed to a meter 10. This is obtained by multiplying two voltages, one of the two voltages being obtained from the voltage drop across the coil 4, the other voltage being proportional and in phase with the current and one of these two voltages being further phase-shifted by 90° with respect to the current.

Figure 3:
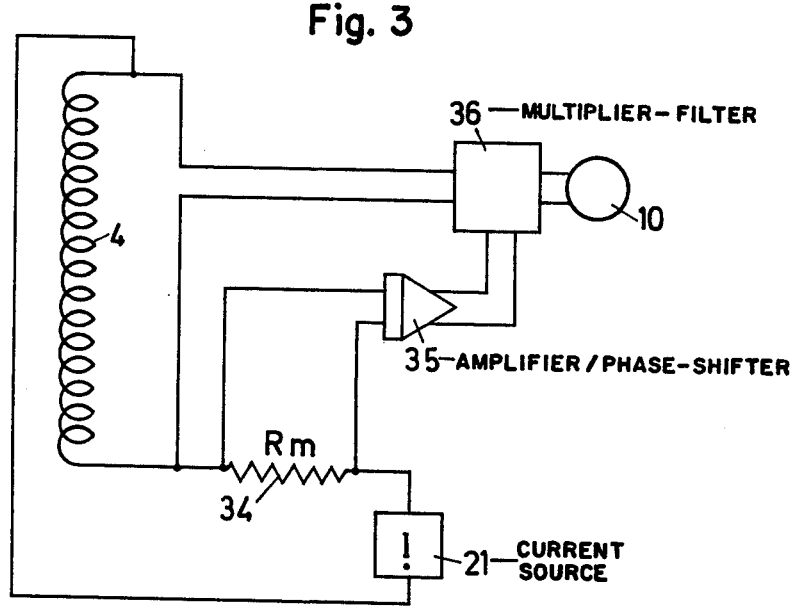
FIGS. 3 to 7 are circuit diagrams of installations according to the invention for the measuring of an essentially linear displacement.

The way along which this is performed particularly in the various installations will be further described hereinbelow. The multiplying can be performed by analog or digital methods. Firstly the analog way:

To suppress from the signal which is measured by meter 10, the influence of resistance portion R of the coil impedance, the installation as shown in figure 3 comprises, in addition to current source 21, coil 4 and meter 10, a resistor 34, a device 35 producing a 90° phase shift and a device 36 which operates as multiplier and filter.

The resistor 34 with a resistance Rm is connected in series with coil 4 and current source 21. There is formed across coil 4 a voltage drop $\underline{I} \cdot \underline{Z}$ having an amplitude $I\sqrt{R^2 + (\zeta\omega)^2}$ which leads current I by an angle $\phi = \arctan(\zeta\omega/R)$. The voltage drop across resistor 34 is in phase with current I; the amplitude of said voltage drop is equal to $RRmI$. $m$I. The device 35 is an integrating operational amplifier with sign-reversal which causes a leading of 90°. When the instantaneous value of the current is equal to I cos $\omega t$, the instantaneous value of the voltage at the input to device 35 is then Rm I cos $\omega t$ and the output voltage of said device 35 is RmIcos ($\omega t$ + 90°). The multiplier in device 36 thus receives at one input the first voltage equal to the voltage drop across coil 4 with the instantaneous value $|Z|$ I cos ($\omega t + \phi$).

To the other input to the multiplier in device 36 is fed the output voltage from device 35. Said output voltage is proportional to the current by 90° but leads the current due to the 90°-lead caused by device 35. To the second input to the multiplier in device 36 is thus fed the alternating voltage RmI cos ($\omega t$ + 90°).

The product at the output from the multiplier in device 36 is a signal with the following value:

$$|Z| \, Rm \, I^2 \cos(\omega t + \phi) \cos(\omega t + 90°) =$$
$$\frac{|Z| \, Rm \, I^2}{2} [\cos(90° - \phi) + \cos(2\omega t + 90° + \phi)].$$

This signal comprises an alternating component with twice the frequency of the current and a continuous component. The alternating component is suppressed by the filter in device 36, in such a way that meter 10 measures a signal which is proportional to $$\frac{|Z| \, Rm \, I^2}{2} \cos(90° - \phi) \text{ or } \frac{Rm \, I^2}{2} |Z| \sin \phi.$$

Devices which perform a multiplication and let through but the continuous component of the signal obtained by multiplication are generally known and consequently device 36 will not be further described.

Figure 8:
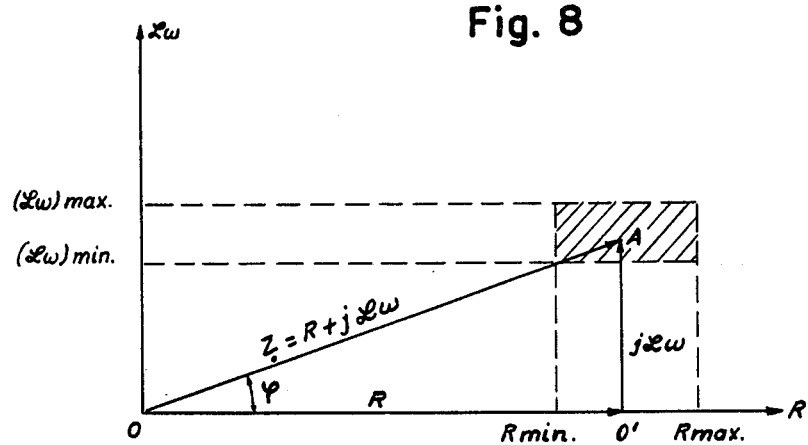
FIG. 8 is a vector showing of impedances to explain the working of the installations according to the FIG. 3.

As known and shown in figure 8, there is a relation $|Z|\sin \phi = \zeta\omega$. The signal which is measured by the meter is thus proportional to $$\frac{Rm \, I^2}{2} L\omega.$$

Rm, I and $\omega$ are constant therein, in such a way that the signal is thus directly proportional to the inductance $\zeta$. There is thus obtained a signal wherein the resistive component R of the coil impedance is suppressed. The principle of a capacitive power meter is actually embodied by the combination of the phase-shifter 35 and the device 36.

The installation according to figure 3 does measure directly the inductance $\zeta$ or reactance $\zeta\omega$, which is the same approximately as $\omega$ is accurately constant, but finally this occurs indirectly by using the total impedance $|Z|$ as actually $|Z| \sin \phi$ is measured. When measuring with the apparatus as shown in FIG. 3, the total voltage drop across the coil is indeed worked in the multiplication which is performed by device 36. Said total voltage drop appears for a large part of the resistive component of the inpedance as said resistive component prevails relative to the reactance. This has the drawback that but a small portion of the measuring range at the multiplier input is used for the usable signal portion in meter 10, which has moreover a bad influence on the measuring accuracy. This drawback is obviated with the installation as shown in FIG. 4.

Figure 4:
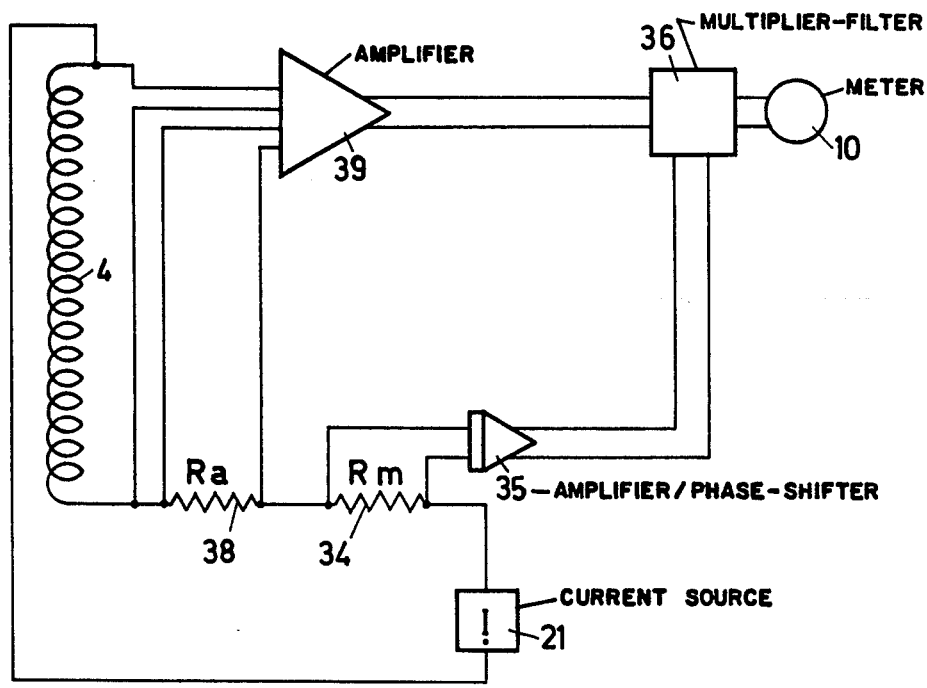

The embodiment as shown in FIG. 4 differs from the embodiment shown in FIG. 3 by the feeding to the input to device 36 instead of the voltage drop across coil 4, said voltage drop minus a voltage which is proportional to and in phase with the current.

For this purpose the installation comprises in series with coil 4, current source 21 and resistor Rm 34, also a further resistor Ra 38. The voltage drop across said resistance Ra is Ra I, an alternating voltage with Ra I thus as amplitude and in phase with the current. The operational amplifier 39 receives at one input the voltage drop in coil 4, thus voltage $Z \cdot I$. At the other input to amplifier 39 is fed the voltage drop across resistance $Ra$, thus voltage $Ra\, I$. Said voltage at the second input to operational amplifier 39 is subtracted from the first voltage at the first input, that is the voltage drop in the coil in such a way that a voltage $Z \cdot I - Ra\, I$ is coupled to the output from operation amplifier 39 is thus equal to $$(R + j\zeta\omega)\, I - Ra\, I \text{ or } [(R - Ra) + j\zeta\omega]I.$$

To the one input to device 36 is coupled for multiplying, instead of signal $(R + j\zeta\omega)\, I$, the signal $[(R - Ra) + J\zeta\omega]I$.

$(R - Ra) + j\zeta\omega$ may be considered as an impedance $Z_1$ having an amplitude $\sqrt{(R - Ra)^2 + (\zeta\omega)^2}$.

$I\, Z_1$ leads current I by an $$\text{angle } \phi_1 = \arctan \frac{L\omega}{R - Ra}.$$

The reasoning and computing regarding the installation as shown in FIG. 3 are further true as well as the replacement of $Z$ by $Z_1$, $|Z|$ by $|Z_1|$ and $\phi$ by $\phi_1$. The signal obtained at the meter is thus proportional to $$|Z_1| \frac{Rm\, I^2}{2} \sin \phi_1$$

but $|Z_1| \sin \phi_1 = \zeta\omega$, in such a way that in this case also the signal at meter 10 is proportional to $$\frac{Rm\, I^2}{2} L\omega,$$

wherein $Rm$, I and $\omega$ are constants. Consequently the signal varies here also directly proportionally to the inductance $\zeta$.

The difference between the operation of the installations as shown in FIGS. 3 and 4 will be explained hereinbelow with reference to FIGS. 8 and 9.

When the resistive component of the impedance of coil 4 varies between $R_{min}$ and $R_{max}$ and when the inductive component of coil 4 varies for a given pulsation or angular frequency between $(\zeta\omega)_{min}$ and $(\zeta\omega)_{max}$, point A of the vector OA, thus $|Z|$, lies in the rectangle indicated in FIG. 8 by hatching and finally meter 10 measures a value corresponding to length OA.

Figure 9:
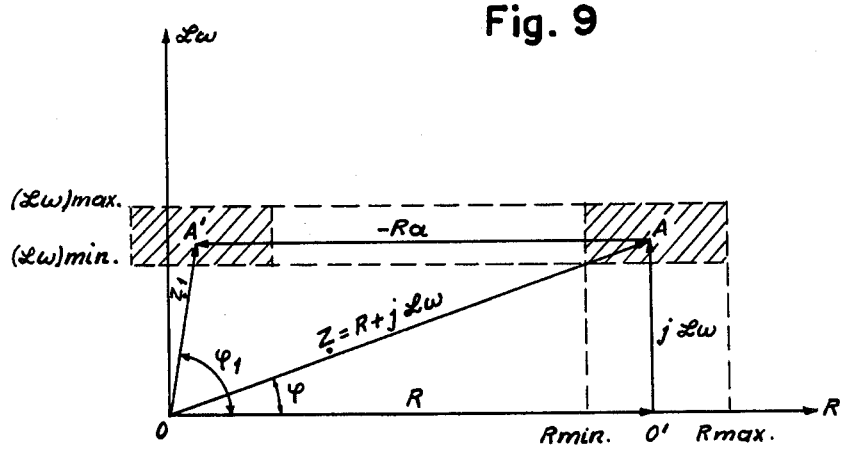
FIG. 9 is a vector showing of the impedances to explain the working of the installation according to FIG. 4.

In the installations according to the invention as shown in FIGS. 3 and 4, the meter 10 shows a signal corresponding to $\zeta\omega$, thus a value corresponding to the length of vector OA (FIGS. 8 and 9).

In the installation as shown in FIG. 3, there is obtained in meter 10 a signal proportional to O'A from a voltage which is coupled to the input to device 36. Said voltage is proportional to the impedance $|Z|$, or in other words to the length of vector OA (FIGS. 8 and 9).

In the installation as shown in FIG. 4 on the contrary, to the input to device 36 there is coupled from operational amplifier 39 a voltage which is proportional to $|Z_1|$ or in other words to the length of vector OA'(-FIG. 9). The signal in meter 10 is $|Z_1| \sin\phi_1 = Z \sin \phi$, but point A' varies inside a rectangle which lies nearer the $\zeta\omega$ axis. The resistive component of the impedance is thus of relatively less importance. The improvement which is obtained with the installation according to FIG. 4 relative to the installation according to FIG. 3 is all the better as $Ra$ differs less from the R value to be measured. $Ra$ is for instance equal to $R_{min}$ or to $(R_{min} + R_{max})/2$.

Even though in FIG. 4 the resistors 34 and 38 have been shown as separate components, they might form also but one component. The voltage which is fed to the input to phase shifter 35 and the voltage which is fed to the one input to operational amplifier 39 are both in phase with and proportional to the current; they might have the same value.

Figure 5:
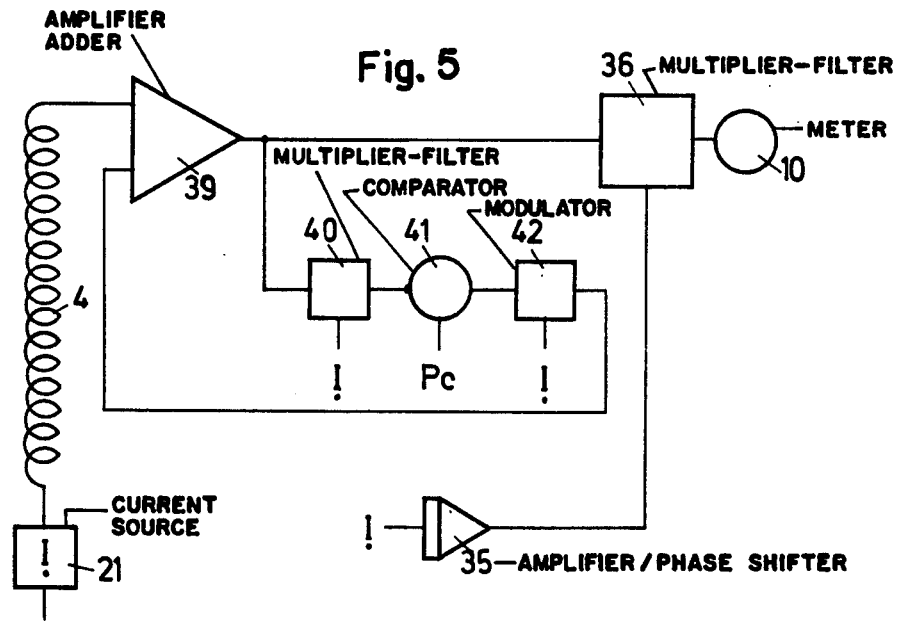

FIG. 5 shows a simplified electric diagram of another embodiment of the installation according to the invention.

The embodiment as shown in FIG. 5 differs from the embodiment shown in FIG. 4 by the feeding to input of device 36, as one of the multiplication factors, instead of the voltage drop in coil 4 reduced by the product of a fixed resistance by the current, $[(R - Ra) + j\zeta\omega]I$, the reactive component of the voltage drop across the coil, thus $j\zeta\omega I$.

As is the case in the embodiment according to FIG. 4, the operational amplifier 39 operating as adder receives at the one input thereto, a signal corresponding to the voltage drop across coil 4, thus $Z\, I$.

The signal which is obtained at the output from adder 39 is coupled to the one input to device 36 to be multiplied therein with the signal from device 35, as was also the case in the embodiment shown in FIG. 4.

In the embodiment as shown in FIG. 5, there should be coupled from the output of adder 39 to device 36, a signal which is a pure measure of $j\zeta\omega I$ and from which the resistive component $R\, I$ has been completely suppressed.

For this purpose, to the other input to operational amplifier 39 is fed a signal $R\, I$ to be subtracted from signal $Z\, I$. The way according to which such signal $R\, I$ is obtained will be described hereinafter.

The output signal from adder 39 is also coupled to the input to a device 40. To the other input of said device 40 is coupled a signal which gives an image of current I, for example the voltage drop in a resistor 38 not shown in FIG. 5. Device 40 performs a multiplication of the signals coupled to both inputs thereof and gives at the output therefrom but the continuous component of said product. The device 40 thus operates in the same way as device 36.

The output signal from device 40 is coupled to a comparator 41 to be compared with a fixed signal $P_C$.

The output signal from comparator 41 $\epsilon$ p is a measure for the differential between the received signal and the fixed value.

The output signal $\epsilon\, p$ is fed to a modulator 42 which also receives a signal representative of current I. Said signal representative of current I is for example a voltage drop across a resistor which is connected in series with current source 21, for instance the voltage drop across resistor 38.

The output signal from modulator 42 is in phase with current I and has a value $R_x I$.

When the selected fixed value $P_C$ with which the comparison is performed in comparator 41 is zero, then $R_x I = R\, I$. Indeed an output signal O at the output from device 40 means that the voltages at both inputs to device 40 which are multiplied with one another, form vectorially a 90° angle. As one of said voltages is in phase with I, the other voltage has no resistive component.

As the adder 39 receives at the one input $(R + j\zeta\omega)\, I$ and as the output signal therefrom is free from resistive component, to the other input thereto is coupled the required value R I for the subtracting, or in other words $R_x = R$.

The device 36 thus receives from operational amplifier 39 a signal $j\zeta\omega I$ or $\zeta\omega I \cos(\omega t + 90°)$. That same device 36 receives from phase shifter 35 a signal $Rm\, I \cos(\omega t + 90°)$.

From device 36 an output is obtained having a direct voltage component $\zeta\omega Rm\, I^2/2$. As $Rm$, I and $\omega$ are constant, said signal varies directly proportionally to the inductance.

Figure 10:
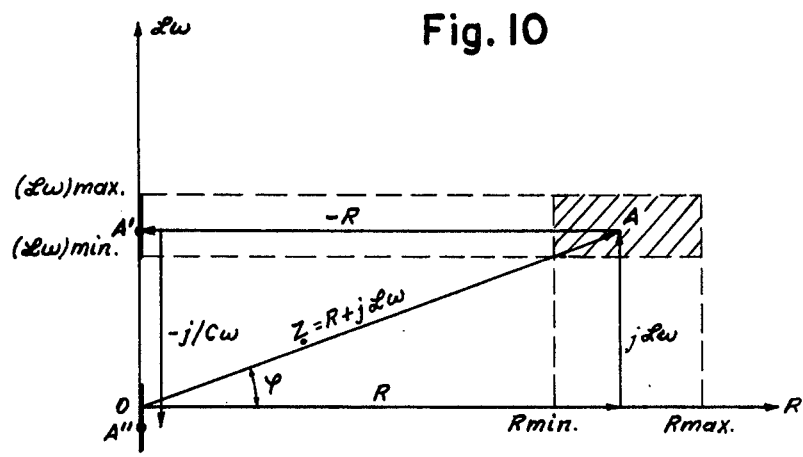
FIG. 10 is a vector showing of impedances to explain the working of the installations according to the FIGS. 5 and 7.

The difference between the operation of the installations shown in FIGS. 3 and 5 will be further described with reference to FIG. 10.

In the installation as shown in FIG. 3, to the input to device 36 is coupled for multiplying, a signal which is a measure for the impedance OA. In the installation as shown in FIG. 5, to the input to device 36 is coupled for multiplying, a signal which is proportional to said impedance OA after vector subtraction of the resistive portion R from said impedance. Thus, rather than subtracting a fixed value Ra from the impedance as is the case with the installation as shown in FIG. 4. The effective resistive component of the impedance is subtracted in such a way that at the input to the device is fed but a signal proportional to the reactance $\zeta\omega$. The multiplication which appears superfluous as the one factor, namely the signal at the output from adder 39, is already a measure for $\zeta\omega$, is performed because the signal at the output from adder has too high a noise level. The point A in the rectangle indicated in FIG. 10 by hatching is simply moved to the $\zeta\omega$ axis and A' no longer now varies inside a rectangle, as is the case with the installation as shown in FIG. 4 (see FIG. 9), but rather along that segment containing A' which is shown by a thicker line in FIG. 10.

In the multiplication performed by device 36, any influence from the resistive component of the impedance of coil 4 has thus been suppressed.

Figure 6:
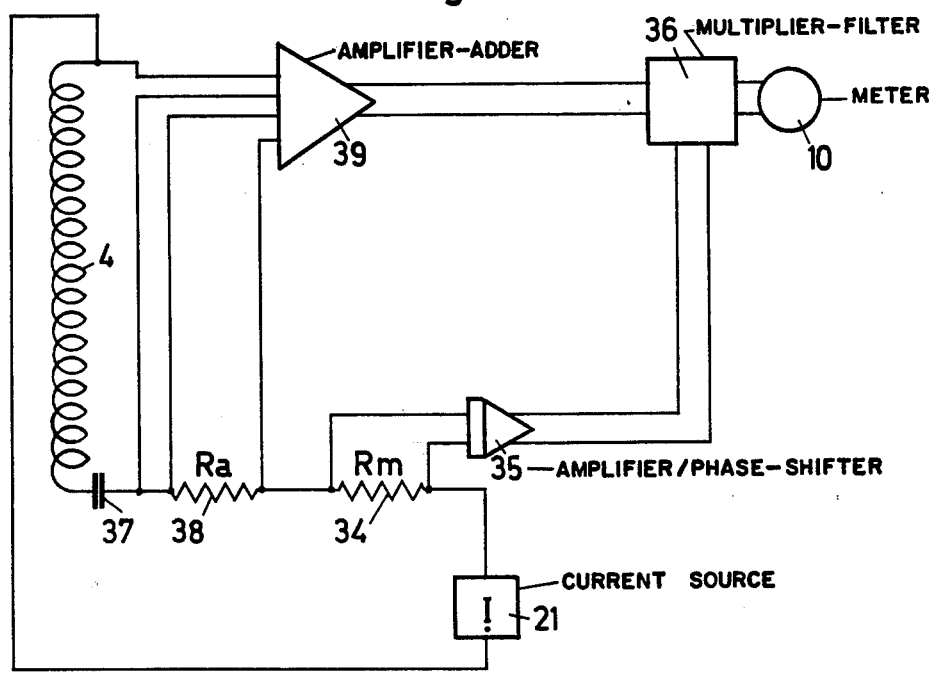

The installation as shown in FIG. 6 corresponds to the installation shown in FIG. 4 with the difference that to the voltage drop in coil 4 is added a voltage which is proportional to the current and lags same by 90°. Said voltage is thus in opposition with the voltage drop caused by the reactive component of the impedance of coil 4.

Actually it is desired to know the change in the inductance and not the absolute value thereof. The influence of $\Delta\zeta$ on the measuring signal should thus be as large as possible. This is obtained as shown in FIG. 6 by connecting in series with the coil a capacitor 37 which has a capacitive reactance of fixed value but which is very near the coil reactance value.

To the input to operational amplifier 39 is now coupled instead of the voltage drop across coil 4, thus $Z\, I$, the voltage drop across coil 4 and capacitor 37, thus $$\left(Z - j\frac{1}{C\omega}\right) I.$$

The signal in meter 10 is thus also no longer proportional to $(Rm\, I^2/2)\,\omega\zeta$ but rather to $$\frac{Rm\, I^2}{2}\left(\omega L - \frac{1}{C\omega}\right).$$

As $Rm$, I, $\omega$ and C are constants, said signal also varies with $\omega\zeta$. As in a relative way, for a given variation in the inductance $\Delta\zeta$, the variation in the signal should be as large as possible, $\zeta\omega - (1/C\omega)$ should be rather small.

Figure 11:
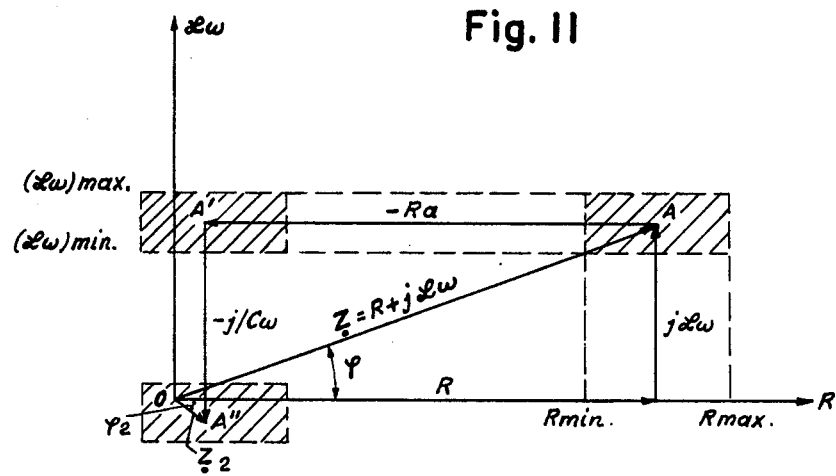
FIG. 11 is a vector showing of impedances to explain the working of the installation according to FIG. 6.

In the installation as shown in FIG. 6, for the multiplying, to the input to device 36 is coupled from the operational amplifier a voltage which is proportional to $|Z_2|$ or to the length of vector OA" shown in FIG. 11.

By subtracting the voltage Ra I inside the operational amplifier 39, the impedance used for the multiplication in device 36 is moved from OA to OA'. By providing capacitor 37, the impedance used for the multiplication in device 36 is moved from OA' to OA". There is thus obtained in meter 10, a signal proportional to OA" sin $\phi_2$ in which $$\phi_2 = \arctan\frac{L\omega - \frac{1}{C\omega}}{R - Ra}.$$

The measuring range is thus moved by providing capacitor 37 from the area indicated by hatching wherein lies A' on the $\zeta\omega$ axis, to the area indicated by hatching wherein lies point A" and which is located about point O.

Figure 7:
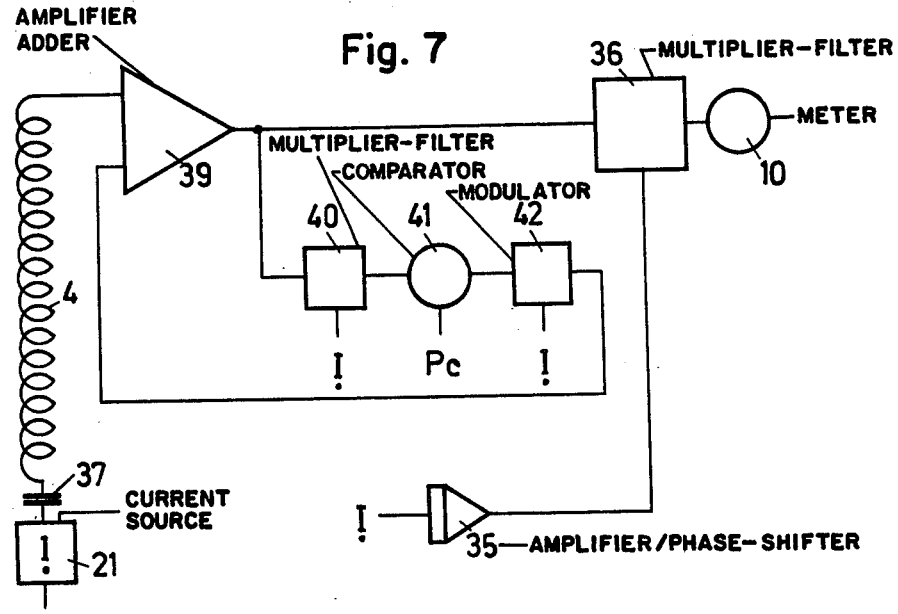

The installation as shown in FIG. 7 differs from the installation shown in FIG. 6 in the same way as the installation from FIG. 5 differs from the installation shown in FIG. 4. In the same way as this was performed for FIG. 5, the subtraction of Ra I is replaced by the subtraction of R I. In this case also the voltage drop across resistor 38, thus Ra I, is not coupled directly to the input to operational amplifier 39, but rather through the combination of elements as described for FIG. 5, which insures that the resistive component of impedance Z is suppressed. The measuring signal in meter 10 is then obtained from an impedance which is exclusively comprised of the reactance of coil 4 from which has been removed the capacitance caused by the capacitor. This has been shown in FIG. 10 in which the impedance OA' taken into account for the multiplication has been modified into OA" by subtracting $j/C\omega$. In the embodiment as shown in FIG. 5, it is actually essentially the varying portion of the coil impedance which is treated in the multiplying operation performed by device 36.

The installations described hereinabove with reference to FIGS. 3 to 7 permit a determination of the position of a rod. The installation according to the invention may also be so designed as to permit a determination of the position of various rods. This will be explained hereinafter with reference to FIGS. 1 and 12.

The installation as shown in the principle sketch of FIG. 1 gives the position of a plurality of control rods 1 in a nuclear reactor.

In FIG. 1 has been shown but one control rod 1 with the associated rod 2 and coil 4. Actually the position of all of the control rods 1 in a nuclear reactor is determined with one and the same central unit 9 to which are connected on the one hand all of the coils 4 and on the other hand all of the meters 10.

In FIG. 1, besides the connection of that coil 4 shown in the drawing, but two additional connections 11 for coils not shown, have been drawn. Actually the central unit 9 has as many connections 11 as there are coils 4 to control, thus as many connections as there are control rods 1 in the nuclear reactor.

For each coil, a meter 10 is connected to central unit 9. In FIG. 1, only two meters 10 have been shown but there are actually as many meters 10 as there are coils 4 to be controlled by the central unit 9.

As described with more details hereinafter with reference to FIG. 12, the central unit comprises an alternating current source having a constant amplitude and pulsation, this unit causing one of the coils 4 to be fed successively and in series through the connections 11 from this alternating current source, the unit obtains from the voltage between the ends of said coil 4, a signal which is proportional to the reactance $\zeta\omega$, and the unit feeds said signal to that meter 10 corresponding to the connected coil.

As the meters 10 receive signals which are proportional to that voltage component which is shifted by 90° relative to the current, thus a signal which is proportional to the inductance of the corresponding coil, said meters measure actually the position of the rods 2. The reading of said position is made directly when the central unit 9 also converts the value for $\Delta\zeta$ into the corresponding value for $\Delta s$ according to the curve shown in FIG. 2 which corresponds to the frequency of the alternating current source, for instance 7. Such installation with a central unit 9 and meter 10 is also shown in FIG. 12, but this installation differs essentially from the installation described before by the fact that the multiplication is not analog but digital, and more especially is performed by binary number calculation.

In the installation according to FIG. 2, the main component in central unit 9 is a microprocessor 12. Said microprocessor which operates various elements in the installation, is a known apparatus which operates relays 13 successively and which transmits the results to registers 15 through an output register 14.

All of the coils 4, two of which have been shown in FIG. 12 by means of the equivalent resistance 5 and inductance 6 thereof, are connected through a corresponding relay 13 to lines 16. The relays 13 are closed separately; in no case should relays of two or more coils be closed together, in such a way that but one of said coils is connected at any one time to lines 16. The microprocessor 12 determines which relay 13 is to be closed. The relays are closed in sequence for a time which is long enough to feed from the central unit 9 of which, the microprocessor 12 is part, an alternating current with constant amplitude and pulsation or angular frequency to the coil 4, to couple the voltage drop across coil 4 to an analog-digital converter 24, to obtain from said voltage drop and the current, the inductance of said coil 4, to compute from said inductance the rod position and to transmit said position to that meter 10 which corresponds to the connected coil.

The way along which these various operations are performed will be further described hereinbelow.

By means of the assembly of units 14 to 21, the coil 4 is fed with a sinusoidal current with constant amplitude and pulsation or angular frequency.

To simplify the numerical treatment the sinusoid of the current is considered as a succession of increments chosen as 1 or zero : + 1 when the sinusoidal path is raising, −1 when this path is descending and 0 when raising or lowering is very small. The sinusoid is divided in a great number of intervals, the amplitude being constant in each interval. The difference between the amplitude of two adjacent intervals is the increment.

The unit 17 is a counter which, being after initialized through the output register 22 by the microprocessor 12 creates successive addresses of the memory 18. Memory 18 delivers the successive increments ($\delta$); 0, +1 or −1, in a determined sequence stored in the memory.

These successive increments are sent to the add-subtract counter 19. The increment succession is such that after compensation in the add-subtract counter, the latter generates a succession of instantaneous digital values having a sinusoidal path. The counter adds, to the sum of unities corresponding to the amplitude of an interval, the increment + 1 (or −1 or 0), between this amplitude and the amplitude of the following interval, which increment is delivered by the memory 18. This representation is called $\delta$ modulation which is known.

Said digital values are converted by the digital-analog converter 20 into a signal. The amplifier 21 receiving this signal feeds to lines 16 and thus to the connected coil a corresponding current. The amplifier 21 can be considered as the AC current source of the installations according to FIGS. 3 to 7 and has therefore been indicated by numeral 21.

The amplitude of the current generated by amplifier 21 is stabilised by resistor 23.

The voltage value across coil 4 is $U = (R + j\zeta\omega) I$. Differential amplifier 25, provided with resistors 28, sends to the digital-analog converter 24 of tracking type the variable component of the signal detected across coil 4. This signal is thus deprived from signals of common mode.

At the output from converter 24 is thus present a digital value following the instantaneous value of the voltage drop across coil 4.

From said voltage $U = (R + j\zeta\omega) I$, $\omega$ and $I$ are known; it is only desired to know $\zeta$ therefrom. R is to be suppressed.

The value of $\zeta$ is known when the reactive power Q is known. Q is always equal to $\omega\zeta I_2$, wherein $\omega$ and $I$ are known. With constant pulsation or angular frequency $\omega$ and current I, the reactive power Q is thus directly proportional to the inductance $\zeta$.

This reactive power calculated for one period is also given by the formula:

$$Q = \frac{1}{T} \int_0^T u(t) \cdot i(t - \frac{T}{4}) \, dt$$

in which
T : period
$u(t)$ : the instantaneous voltage across coil 4
$i(t)$ : the instantaneous current through coil 4

$$i(t - \frac{T}{4})$$

is thus the current through coil 4 with a phase lead of 90° or one fourth of a period.

Thus the voltage across the coil, $u(t)$, is multiplied by a value proportional to and in phase with the 90°-shifted current $$i(t - \frac{T}{4}).$$

From the average value (obtained by dividing by T) of the integral of the product $$u(t)i(t - \frac{T}{4})$$

for one period, there is thus obtained a value Q, which is directly proportional to $\zeta$ thus the value looked for.

In a digital version the integral of a product of two continuously varying magnitudes is replaced by the sum of the product of the discrete values.

Such discrete version gives;

$$Q = \frac{1}{n} \sum_{j=0}^{n} u(t_j) i(t_j - \frac{T}{4})$$

Thus for a finite number $(n + 1)$ of moments, the values of the products are added together.

$u(t_j)$ is thus the instantaneous voltage across the coil in moment $t_j$ $i(t_j)$ is the instantaneous current through the coil in moment $t_j$ $$i(t_j - \frac{T}{4})$$

is the instantaneous current with a 90° phase lead $t_j$ is an arbitrary moment during the period divided into $n$ parts, in which $j$ thus varies from 0 to $n$.

$n$ has for instance a value of 2047.

As the current is of sinusoidal form, $$i(t - \frac{T}{4})$$

is proportional to $$\frac{di(t)}{dt} Q$$

is then also proportional to $$\frac{1}{n} \sum_{j=0}^{n} u(t_j) \left[ \frac{di(t_j)}{dt} \right]$$

As the current has been generated digitally in δ modulation, thus represented as a number of increments which are $+1$, $-1$ or 0, there is already present by the generating of the current a value which is a proportional to the current derivative, namely the increment δ.

$\delta(t)$, the increment measured in moment $t$, which gives the increase (or decrease) of the amplitude is a measure for the current derivative, $di(t)/dt$. Consequently $$Q = k \frac{1}{n} \sum_{j=0}^{n} u(t_j) \delta(t_j).$$

$k$ is a constant therein.

As mentioned above when describing the current generating, the increment δ has been chosen having a value $+1$, 0, or $-1$.

$$\sum_{j=0}^{n} u(t_j) \delta(t_j)$$

thus corresponds to n arithmetical operations of the values $u(t_j)$.

The instantaneous value of increment δ determines whether an addition ($\delta = +1$) or a subtraction ($\delta = -1$) or no operation ($\delta = 0$) is performed. These operations (additions or subtractions) occur in the accumular 29. The accumulator 29 receives on the one hand in digital form, the values of the voltage $u(t_j)$ this is the voltage drop across the coil, from the analog-digital converter 24. On the other hand the delta value $\delta(t_j)$ which corresponds to a signal proportional to the current but 90° phase-shifted with respect to this current is given to the accumulator 29 by the memory 18.

In the output register 31, the result of the operations performed during one period is stored.

When register 31 is loaded, it sends through flip-flop 32 an interrupting instruction to the microprocessor 12, which reads the computed value in the register 31.

Said value is proportional to the reactive power Q and as the current amplitude and pulsatance are constant, it is also proportional to the inductance $\zeta$.

In fact the accumulator 29 and the register 31 perform a multiplication corresponding to the multiplication performed in the multiplier 36 of the installation according to FIGS. 3 to 7, but does it in a digital manner, by a number of additions and subtractions.

The microprocessor 12 is programmed to obtain from said inductance $\zeta$ the position of the rod according to a curve of the type of curve 7 in FIG. 2. The memory of microprocessor 12 comprises naturally for this purpose the data of the curve which corresponds to the frequency of the generated current.

The digital value of the rod position (s) which is computed by the microprocessor 12 from the succeeding values $u(t_j)$ and $\delta(t_j)$ according to the suitable curve, for the connected coil 4, is sent by said microprocessor 12 to the register 15 corresponding to that same coil.

To each register 15 corresponds a digital-analog converter 33. Said converter couples the analog signal to the galvanometer 10 connected thereto, which forms said meter.

The register 15 and consequently the meter 10 store the measured value until the microprocessor 12 transmits to the register 15 a new value computed from new data from register 32 and relating to the same coil 4.

After microprocessor 12 has closed through the output register 14 a relay 13 of a particular coil 4, has caused as described above to couple to said coil 4 a current, and has obtained from the voltage drop across said coil and from the increments, the position of rod 2 and thus of the control rod 1 which corresponds to said coil, said position being communicated to the corresponding meter 10, the microprocessor 12 cuts off the relay of the coil considered.

The microprocessor 12 then closes again through the output register 14 the relay 13 of a following coil 4 and measure is started for this coil.

Thus the microprocessor controls in sequence the closing of the various relays 13 and the operation of the units 17 to 21, the analog-digital converter 24 and the units connected thereto for each one of the coils 4, in such a way that new measuring results are fed in sequence to the meters 10.

Each output register 15 stores the received measuring result until a new result is fed thereto.

The various logical units are synchronized through clock impulses generated by impulse generator 26.

With a normal commercially-available microprocessor, converter, counters, registers, accumulator, etc., it is possible to mount an installation which requires for the sequential treatment of 33 coils, but ½ second.

Every 1½ second then the result which is read on the meter is brought in accordance with the effective rod position, while each result is stored in the meter until it is replaced by a new result. The variation in a rod position is thus displayed with a delay of 1½ second at the most.

The above described installation may be adapted in various ways to bring the measuring results displayed on the meters 10 closer to the effective rod position as well as to incorporate safety measures therein. Such safety measures may relate to the installation and they can then prevent a faulty working of the installation. They may also relate to elements located outside the installation. For instance a signal may be given when one of the control rods comes to a position which might be abnormal.

To bring the measuring results displayed on the apparatus 10 closer to the effective rod position, the microprocessor 12 may then perform a computing which compensate the temperature influence.

The inductance $\zeta$ is indeed dependent not only on the rod position, thus on $s$, and on the current frequency, but also on the temperature.

For each temperature there is a different $(\Delta\zeta,\Delta s)$ or $(\zeta,s)$ curve.

All of these curves may be determined by calibrating. $\zeta$ is thus dependent according to laws to be determined by calibrating, on the rod position $(s)$, on the current frequency $(f)$ and on the temperature $(t)$.

After having determined for two known but different frequencies, the values of $\zeta$ in two shortly succeeding moments, thus without the possibility of the rod position or the temperature having changed between these two moments, it is possible to obtain from the values for $\zeta$ the two unknowns, namely the rod position and the temperatures or better still obtain the rod position after eliminating the temperature from both functions:

$$\zeta_1 = F(f_1, s, t)$$

$$\zeta_2 = F(f_2, s, t)$$

The inductances $\zeta_1$ and $\zeta_2$ are determined by the microprocessor in the above described way for the frequencies $f_1$ and $f_2$.

Frequencies are selected so that for one of the frequencies $(f_1)$ the influence of $\Delta s$ on $\Delta\zeta$ is at a minimum and a maximum influence of $\Delta s$ on $\Delta\zeta$ is reached for the other frequency $(f_2)$.

A microprocessor 12 of a suitable type can eliminate the temperature $t_1$, compute s and send the value thereof to the corresponding register 15 and therefrom to the meter 10 connected thereto.

The microprocessor may also perform correction computings which take into account the imperfect linearity of the rod displacement and the mutual influence of adjacent measuring coils.

A safety feature relating to the installation proper and to a faulty working of part of the installation lies in a dual arrangement of the central unit 9, that is of all of the components which take part in the determining of the position of each rod.

Two central units can be so connected that they work simultaneously in staggered sequence. When the sequential treatment for all of the rods takes 1½ second when both units are operating, such treatment requires 3 seconds for still operating units if the other unit is necessary.

Another safety feature which relates to the installation proper lies in an additional coil which is not used for the measuring of the rod position.

Said additional coil with fixed inductance is introduced in the sequential treatment. A measurement is thus performed for this coil as well as for the other coils which are used to determine the position of a rod. To said additional coil also corresponds a measure channel.

As the inductance for the additional coil is known, it is possible to compare every time the measured value for this coil with the known value. When there is a descrepancy, this means that something went wrong in the measurings.

A safety feature which relates to elements located outside the installation causes for instance the working of a signal when one rod takes an abnormal position. It is simply necessary therefore to store in the microprocessor 12 those values which are reached by the inductances when the rods reach the abnormal position and to cause said microprocessor to send a signal when an actually measured inductance corresponds to such a limit value.

It must be understood that the invention is not limited to the above embodiments and that many changes can be brought therein without departing from the scope of the invention as defined by the appended claims.

Instead of phase-shifting by 90° before the multiplying, the second voltage which is proportional to and in step with the current, it is for example possible to perform such phase-shifting for the voltage drop across the coil.

We claim:

1. Installation for the measuring of an essentially linear displacement of a body, with a fixed coil the axial direction of which corresponds to the direction of the displacement to be measured, a rod the magnetic permeability of which differs from the magnetic permeability of the medium which is surrounded by the coil, means for connecting said rod along the axis of the coil to that body the displacement of which should be measured, an A.C. source with constant amplitude and pulsation (angular frequency) causing a voltage drop in the coil, means electrically connected to the coil and generating a voltage signal dependent of and in phase with the voltage drop in the coil, means electrically connected in series with the AC current source, generating a signal proportional to and in phase with the current through the coil, means for phase shifting by 90° one of said signals, which means are electrically connected to the means which generates the signal, a device which operates as a multiplier for multiplying the phase-shifted signal and the other signal which device is electrically connected to the means for phase shifting and to the means for generating the non-shifted signal and a meter electrically connected to the device which operates as a multiplier measuring the signal obtained by the multiplication performed in the device.

2. Installation as defined in claim 1, in which the means for phase shifting by 90° are electrically connected to the means generating a signal proportional to and in phase with the current.

3. Installation as defined in claim 1, in which the device which operates as a multiplier is an analog multiplier, the means generating a signal proportional to and in phase with the current being means generating a voltage signal, the installation further comprising a filter which is mounted between the multiplier and the meter and which passes only the continuous portion of the signal obtained by multiplication.

4. Installation as defined in claim 3, in which the means generating said voltage signal proportional to and in phase with the current, comprise a resistor connected in series with the alternating current source and the coil.

5. Installation as defined in claim 3, in which the means for shifting by 90° one of said voltage signals comprises an integrating operational amplifier.

6. Installation as defined in claim 3, in which the means generating a voltage signal dependent on and in phase with the voltage drop are shunting the coil and generate a voltage proportional to and in phase with the voltage drop itself.

7. Installation as defined in claim 3, in which the means generating a voltage signal dependent on and in phase with the voltage drop in the coil are comprised of means connected to the coil generating a voltage proportional to the voltage drop in the coil itself, means generating voltage which is proportional to and in phase with the current through the coil, which means are connected in series with the coil and the AC current source, and means electrically connected to the latter mentioned means for subtracting the last mentioned voltage which is proportional to and in phase with the current from the first mentioned voltage proportional to the voltage drop in the coil.

8. Installation as defined in clim 7, in which the means generating the last mentioned voltage which is proportional to and in phase with the current, generate a voltage which is equal to that voltage component of the voltage between the ends of the coil which is in phase with the current.

9. Installation as defined in claim 8, in which the means which generate the latter mentioned voltage which is proportional to and in phase with the current comprise a resistor, connected in series with the alternating current source and the coil, the resistance of which is substantially equal to the coil resistance.

10. Installation as defined in claim 7 in which the means generating a voltage proportional to and in phase with the current, which means are part of the means generating a voltage signal dependent of and in phase with the voltage drop in the coil, are the same means, generating the voltage proportional to and in phase with the current mentioned in claim 1.

11. Installation as defined in claim 7, in which the means generating the latter mentioned voltage which is proportional to and in phase with the current and which form a part of the means generating a voltage signal dependent of and in phase with the voltage drop, are comprised of a second multiplier the first input to which is connected to the output from the means for subtracting said latter mentioned voltage from the voltage between the ends of the coil and a second input to which is connected means generating a voltage which is proportional to and in phase with the current and the output from which is connected through means letting but the continuous component of the signal obtained by multiplication pass therethrough, to a comparator which compares said received signal with zero and the output from which is connected to one input to a modulator the other input to which is connected to means generating a voltage which is proportional to and in phase with the current, the output from said modulator being connected to that input feeding the voltage to the means substracting said last mentioned voltage proportional to and in phase with the current from the voltage drop in the coil.

12. Installation as defined in claim 7, in which the means generating a voltage signal dependent of and in phase with the voltage drop in the coil comprises means connected to the coil generating a voltage proportional to the voltage drop in the coil, means generating a voltage which is proportional to the current and is lagging in phase by 90° with respect to the current and means adding the two latter mentioned voltages.

13. Installation as defined in claim 12, in which the means generating a voltage proportional to the current and lagging by 90° therewith, generate a voltage which is substantially equal to the voltage component which is leading the current by 90° of the voltage between both ends of the coil.

14. Installation as defined in claim 13 in which the means generating a voltage proportional to the current and lagging by 90° therewith comprise a capacitor connected in series with the above mentioned coil and the capacitance C of which has a fixed value which is substantially equal to $1/\zeta\omega^2$ with $\zeta$ the inductance of the coil and $\omega$ the angular frequency of the current source.

15. Installation as claimed in claim 1, in which the device which operates as a multiplier is a digitally operating multiplier.

16. Installation as defined in claim 15, in which the alternating current source generates a sinusoidal voltage the means for phase shifting by 90° with respect to the current are connected to the means for generating a signal proportional to and in phase with the current, the two last mentioned means being comprised by means that generates for a period of the current, from a zero value of this current, a signal which is porportional to the current derivative which is the digital form of the signal proportional to the current but 90° phase shifted, the device which operates as a multiplier multiplying the instantaneous voltage drop across the coil and said signal proportional to the current derivative, and integrating the multiplication product over said period.

17. Installation as defined in claim 16, in which the alternating current source which generates a sinusoidal current comprises means for feeding increments to a digital-analog converter such that the output signal of this converter corresponds with the sinusoidal current, and the means for generating a signal proportional to the derivative of the current are comprised of means forming those increments.

18. Installation as defined in claim 17, in which the means for integrating the product of the multiplication is an accumulator of discrete values of the voltage between the ends of the coil multiplied with the value of one of said increments.

19. Installation as defined in claim 1, for measuring the essentially linear displacement of a plurality of bodies, which comprises for each body the displacement of which should be measured, a fixed coil the axial direction of which corresponds with the direction of the displacement to be measured, a rod the magnetic permeability of which differs from the magnetic permeability of the medium which is surrounded by the coil, means to connect this rod along the coil axis to said body, as well as one or more alternating current sources with constant amplitude and angular velocity, means feeding each of the coils successively from said alternating current sources, means electrically connected to the coil and generating a voltage signal dependent of and in phase with the voltage drop across the coil, means electrically connected in series with the AC current source, generating a signal proportional to and in phase with the current through the coil, means for phase shifting by 90° one of said signals, which shifting means are electrically connected to the means which generates the signal, a device which operates as a multiplier for multiplying the phase-shifted signal and the other signal which device is electrically connected to the means for phase shifting and to the means for generating the non-shifted signal and a meter electrically connected to the device which operates as a multiplier measuring the signal obtained by the multiplication performed in the device.

20. Installation as claimed in claim 19, in which the alternating current source can generate two currents of different frequencies and which installation comprises a means for eliminating temperature influence from signals deriving from said currents, in proportion to the component of said voltage between the ends of the coil which is phase shifted by 90° with respect to the current.

21. Installation as defined in claim 20, in which for one of both frequencies, influence of the rod position on voltage drop in the coil is at a minimum.

22. Installation as claimed in claim 20, which comprises in addition to fixed coils corresponding to each of the bodies, one or more additional coils of known inductance, said one or more additional coils serving as reference coils for checking the operation of the installation.

* * * * *

UNITED STATES PATENT OFFICE
CERTIFICATE OF CORRECTION

Patent No. 4,103,233        Dated July 25, 1978

Inventor(s) Armand Timmermans, Eduard Selleslagh & Jose Deneyer

It is certified that error appears in the above-identified patent and that said Letters Patent are hereby corrected as shown below:

On the title page under Item [30], the second priority document should be identified as follows:

-- July 30, 1976 [BE] Belgium .......... 169417 --

Signed and Sealed this

Thirteenth Day of March 1979

[SEAL]

Attest:

RUTH C. MASON  
Attesting Officer

DONALD W. BANNER  
Commissioner of Patents and Trademarks